United States Patent
Sada et al.

(10) Patent No.: US 7,238,444 B2
(45) Date of Patent: Jul. 3, 2007

(54) LITHIUM SECONDARY BATTERY

(75) Inventors: Tsutomu Sada, Otsu (JP); Kazunari Takeda, Tsurugashima (JP); Yumiko Takashima, Tano-gun (JP); Naoto Nishimura, Kashihara (JP); Takehito Mitate, Yamatotakada (JP); Kazuo Yamada, Kitakatsuragi-gun (JP); Motoaki Nishijima, Gose (JP); Naoto Torata, Kashihara (JP)

(73) Assignees: Dai-Ichi Kogyo Seiyaku Co., Ltd., Kyoto (JP); Sharp Corporation, Osaka (JP)

( * ) Notice: Subject to any disclaimer, the term of this patent is extended or adjusted under 35 U.S.C. 154(b) by 528 days.

(21) Appl. No.: 10/381,516

(22) PCT Filed: Sep. 28, 2001

(86) PCT No.: PCT/JP01/08524
§ 371 (c)(1),
(2), (4) Date: Aug. 12, 2003

(87) PCT Pub. No.: WO02/27856
PCT Pub. Date: Apr. 4, 2002

(65) Prior Publication Data
US 2004/0029010 A1    Feb. 12, 2004

(30) Foreign Application Priority Data
Sep. 29, 2000   (JP) ............................. 2000-297764

(51) Int. Cl.
*H01M 2/16*   (2006.01)
(52) U.S. Cl. .................. 429/144; 429/231.95
(58) Field of Classification Search ................. 429/303
See application file for complete search history.

(56) References Cited

U.S. PATENT DOCUMENTS

| 6,187,479 B1 * | 2/2001 | Liu ............................ 429/300 |
| 6,284,412 B1 * | 9/2001 | Minakata et al. ........... 429/303 |
| 2004/0029009 A1 | 2/2004 | Sada |

FOREIGN PATENT DOCUMENTS

| JP | 01-124971 | * | 5/1989 |
| JP | 5-325631 | | 12/1993 |
| JP | 06-096800 | * | 4/1994 |
| JP | 6-96800 | | 4/1994 |
| JP | 06-223877 | * | 8/1994 |
| JP | 11-16579 | | 1/1999 |
| JP | 11-288738 | | 10/1999 |
| JP | 2000-90925 | | 3/2000 |
| JP | 2000-090925 | * | 3/2000 |

* cited by examiner

*Primary Examiner*—Susy Tsang-Foster
*Assistant Examiner*—Tony Chuo
(74) *Attorney, Agent, or Firm*—Miller, White, Zelano, Branigan, P.C.

(57) ABSTRACT

A lithium secondary battery which comprises a negative electrode, a positive electrode, and disposed therebetween a polymer electrolyte comprising an ionically conductive polymer. The polymer electrolyte has a two-layer structure composed of a positive-electrode-side layer and a negative-electrode-side layer. The polymer electrolyte on the positive-electrode side contains a nonaqueous electrolytic solution containing a lithium salt in a higher concentration than that in the polymer electrolyte on the negative-electrode side. The battery is improved in charge/discharge cycling characteristics and high-load discharge characteristics.

14 Claims, 6 Drawing Sheets

LITHIUM SECONDARY BATTERY

FIELD OF THE INVENTION

This invention relates to a lithium secondary battery using an ion-conductive polymer. More specifically, it relates to a lithium secondary battery comprising an anode for lithium batteries, a cathode containing or capable of inclusion/release of lithium, and an ion-conductive polymer layer sandwiched between the cathode and the anode.

BACKGROUND ART

Lithium secondary batteries relying on the electrochemical reactions of $$Li^+ + e^- \rightarrow Li$$

in the charge stage, and $$Li \rightarrow Li^+ + e^-$$

in the discharge stage have been vigorously studied and developed as a power source of portable electronic instruments or electric motor cars because they have a very high energy density in theory compared to other batteries and thus allow to manufacture small size, light weight batteries. The performance of portable electronic instruments is ever increasing in recent years and their power consumption is also increasing concominately therewith. For use as a power source of these instruments in particular, the power source is required to have a satisfactory discharge characteristics even under heavy loads. Following lithium batteries using an organic electrolyte solution referred to as "lithium ion battery", studies on batteries using a lithium ion-conductive polymer functioning both as the organic electrolyte solution and also as a polymer separator of the prior art batteries are in progress. The lithium secondary battery using the lithium ion-conductive polymer is very attractive because of its remarkable advantages such as possibility of making the battery smaller and thinner in size and lighter in weight as well as leak free. Lithium secondary batteries of this type now available in the market use a porous matrix of ion-conductive polymer impregnate with or retaining an organic electrolyte solution (a solution of lithium salt in an aprotic polar solvent) therein. However, leakage of the organic electrolyte solution from the battery has not fully been prevented in various environments.

When metallic lithium is used as anode in the lithium secondary battery, one problem is how the growth of lithium dendrite on the anode is prevented for improving the charge-discharge cycle characteristics. Various studies have also been made in order to solve this problem. JP-A-6223877 and JP-A-8329983 are representative examples of such studies among them.

JP-A-6223877 proposes to provide a plurality of ion-conductive layers having different lithium salt concentrations between the cathode and the anode in order to prevent the growth of lithium dendrite on the anode. JP-A-8329983 proposes to provide a pair of electrolyte layers separately on the cathode and the anode, respectively and to give higher ion-conductivity to the layer on the anode than the other layer on the cathode in order to prevent internal short circuit from occurring due to the growth of lithium dendrite. The object of these proposals is to provide a lithium secondary battery having high reliability and excellent cycle characteristics by preventing the internal short circuit.

JP-A-2000/106212 proposes a lithium battery having improved battery performance upon high rate discharge. The battery includes three separate layers of an electrolyte gel in which at least one layer either on the cathode or anode is different in the composition of electrolyte gel from the electrolyte gel in the separator such that the concentration of lithium salt is always higher in the separator than in the cathode and/or anode. This proposal, however requires to form three electrolyte layers independently on the two electrodes and the separator formed by laminating the three layers together and necessarily results in increased number of interfaces between the electrolyte gel layers undesirably for decreasing the internal resistance within the battery and also increased number of steps for manufacturing the battery.

Although the performance of lithium secondary battery is advancing by the use of ion-conductive polymer in conjunction with the use of improved ion-conductive polymer on the anode, further improvements are still demanded in the various performance of lithium secondary battery such as charge-discharge cycle life, discharge characteristics at a high load and other properties. In addition, we have conceived to decrease the number of interfaces between various electrolyte layers by essentially dispensing with an independent layer of ion-conductive polymer in the separator and decrease the internal resistance of the battery correspondingly.

DISCLOSURE OF THE INVENTION

The patent literature cited above addresses prevention of internal short circuit on the anode side. As a result of our studies on the ion-conductive polymer on the anode side, we have reached the following conclusion. It is very difficult to fully prevent the growth of lithium dendrite even when a lithium ion-conductive polymer containing an organic electrolyte solution in the matrix thereof is used. Conversely, when the growth of lithium dendrite is fully prevented, the anode activity and the discharge characteristics under heavy loads will decrease.

Since the growth of lithium dendrite cannot be prevented with 100% probability solely by the improvement in the ion-conductive polymer on the anode side and in view of the fact that the ion-conductive polymer on the cathode side has not been improved well to date, our attention was drawn to the improvement of the ion-conductive polymer on the cathode side.

Accordingly, the present invention provide a lithium secondary battery comprising an anode for lithium batteries, a cathode containing lithium or capable of inclusion/release of lithium, and an ion-conductive polymer layer disposed between the cathode and the anode. According to the present invention, the concentration of a lithium salt in a nonaqueous electrolyte solution retained in the matrix of said ion-conductive polymer is higher on the cathode side than on the anode side.

The present invention provides a small size, light weight battery having the following advantages over the prior art battery.

1) It has high performance and a high energy density. Higher lithium salt concentration on the cathode side decreases the interfacial resistance and enables not only the charge-discharge cycle characteristics but the discharging characteristics under a high load to be improved.

2) A discrete layer of ion-conductive polymer in the separator may be dispensed with by joining two sub-layers of the ion-conductive polymer integrally formed on the anode and the cathode together directly to decrease the number of interfaces and also decrease the internal resistance in the battery correspondingly.

3) Decomposition of compounds contained in the ion-conductive layer may be prevented by using a particulate graphite having amorphous carbon attached on the surfaces thereof. This allows the battery to be leak-free and exhibit high long term reliability as well as high safety.

4) The battery may be produced by a highly efficient process. This is accomplished either by casting a precursor monomer of the ion-conductive polymer onto the cathode and the anode and crosslinking the electrolyte layer by heat or UV radiation, or by crosslinking the electrolyte layer in the separator integrally with the electrolyte layer on either one of the cathode and the anode.

BEST MODE FOR CARRYING OUT THE INVENTION

Figure 1:
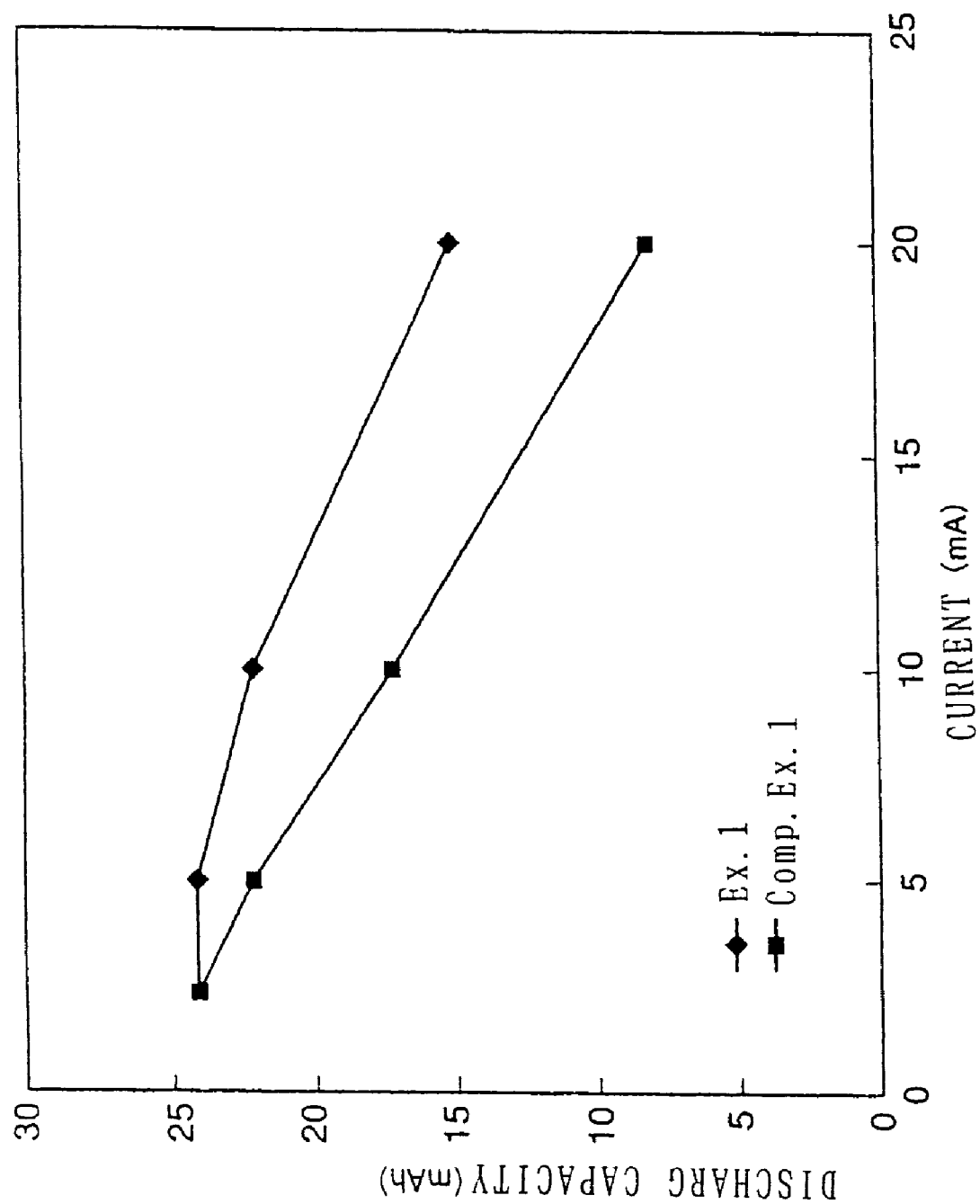
FIG. 1 is a graph showing the discharge capacity of the battery according to Example 1 of the present invention at different current levels in comparison with the battery of Comparative Example 1.

The present invention relates to a lithium secondary battery comprising an anode for lithium battery, a cathode containing or capable of inclusion/release of lithium, and an ion-conductive polymer layer disposed between the cathode and the anode.

According to the present invention, the ion-conductive polymer layer is comprised of a matrix of said ion-conductive polymer retaining a nonaqueous electrolyte solution therein and comprises a laminate of two sub-layers formed on the cathode and the anode. The invention is further characterized in that the concentration of a lithium salt in the nonaqueous electrolyte solution is higher in the sub-layer on the cathode than in the sub-layer on the anode.

By setting the lithium salt concentration in the nonaqueous electrolyte solution at different levels in this way, the following advantages are achieved in comparison with the case where the lithium salt concentration is uniform throughout the entire ion-conductive polymer layer.

1) The interfacial resistance between the cathode and the ion-conductive layer is minimized and, therefore, the discharge characteristics at a high load is improved.

2) The mobility of lithium ions is retarded in the sub-layer of ion-conductive polymer on the cathode to prevent the growth of lithium dendrite from reaching the cathode.

3) A concentration cell is formed within the battery and, the voltage within the battery is elevated thereby. This enables a battery having a high energy density to be provided.

In a preferred embodiment, the anodic electroactive substance is a graphite powder having amorphous carbon attached to the surfaces thereof. The use of this carbonaceous material in conjunction with the laminate of ion-conductive polymer sub-layers prevents decrease in the discharge capacity during repeated charge-discharge cycles. This may be attributed to retarded side reactions between the nonaqueous electrolyte solution and lithium formed upon charging.

The battery of the present invention may be manufactured by forming an ion-conductive polymer layer separately on a pre-fabricated cathode and anode and joining the layers together although the manufacturing process is not limited thereto.

Examples of anodic electroactive substances include lithium metal, a lithium-aluminum alloy, a lithium-lead alloy, a lithium-tin alloy, a lithium-aluminum-tin alloy, a lithium-gallium alloy, Wood's alloy and other alloys containing lithium but are not limited thereto. These anodic substances may be used alone or in combination.

It is also possible to use as the anodic electroactive substance a carbonaceous material capable of electrochemically inclusion and release of lithium such as graphite. More preferably, the carbonaceous material is graphite particles having attached on the surfaces thereof amorphous carbon particles. These particles may be obtained by dipping the graphite particles in a coal-based heavy oil such as coal tar or pitch or a petroleum-based heavy oil and heating recovered graphite particles to a temperature above the carbonizing temperature to decompose the heavy oil, if necessary, followed by milling. Such treatment significantly retards the decomposing reaction of the nonaqueous electrolyte solution and the lithium salt occurring at the anode during the charge cycle to enable the charge and discharge cycle life to be improved and also the gas evolution due to the above decomposition reaction to be prevented.

Examples of the cathodic electroactive substances which are usable in the present invention include oxides of metals of group 4A and 4B of the periodic chart such as $TiS_2$, $SiO_2$, or SnO; oxides of metals of 5A and 5B of the periodic chart such as $V_2O_5$, $V_6O_{12}$, VOx, $Nb_2O_5$, $Bi_2O_3$ or $Sb_2O_3$; oxides of metals of group 6A and 6B of the periodic chart such as $Cr\ O_3$, $Cr_2O_3$, $MoS_2$, $WO_3$ or $SeO_2$; oxides of metals of group 7A such as $MnO_2$ or $Mn_2O_3$; oxides of metals of group 8 of the periodic chart such as $Fe_2O_3$, FeO, $Fe_3O_4$, $Ni_2O_3$, NiO, $CoS_2$ or CoO; and a metal compound of the general formula:

$Li_aMX_2$ or $Li_aMNbX_2$ wherein M and N are a metal of group 1 to 8 of the periodic chart and X is a chacogen element such as oxygen or sulfur, such as lithium-cobalt composite oxide or lithium-manganese composite oxide, as well as a conductive polymer material such as polypyrrole, polyaniline, polyparaphenylene, polyacetylene or polyacene and a carbonaceous material of pseudographite structure but are not limited thereto.

The cathodic electroactive substance to be used in the present invention in conjunction with the carbonaceous anodic active substance is preferably selected from a composite oxide of laminar or spinel structure represented by the formula: $Li_a(A)_b(B)_cO_2$ wherein A is a transition metal element;

B is an element selected from the group consisting of a non-metal or semi-metal element of group 3B, 4B and 5B of the periodic chart, an alkaline earth metal, Zn, Cu and Ti;

a, b and c are numbers satisfying the following relationship:

$0 < a \leq 1.15$ $0.85 \leq b+c \leq 1.30$, and $c > 0$

Typical examples of the composite oxides include $LiCoO_2$, $LiNiO_2$ and $LiCo_xNi_{1-x}O_2$ ($0<x<1$). Use of these compounds in conjunction with a carbonaceous material as a anodic electroactive substance is advantageous in that the battery exhibits a practically acceptable dynamic voltage even when the voltage variation generated by charging and discharging the carbonaceous material per se (about 1 volt vs. $Li/Li^+$), and that lithium ions necessary for charging and discharging the battery are already contained in the form of, for example, $LiCoO_2$ or $LiNiO_2$ before assembling the battery.

The respective electroactive substances may be combined, where necessary, with a chemically stable conductor material such as graphite, carbon black, acetylene black, carbon fiber or conductive metal oxides.

The binder is selected among those thermoplastic resins which are chemically stable, soluble in a suitable solvent but hardly attacked with the nonaqueous electrolyte solution. A variety of such thermoplastic resins have been known. For example, polyvinylidene fluoride (PVDF) may preferably be used since this resin is selectively soluble in N-methyl-2-pyrrolidone.

The electrode may be produced by kneading the respective electroactive substances and, where necessary, the conductor material with a solution of the binder resin to prepare a paste, applying the paste on a metal foil using a suitable coater to form a film of uniform thickness, and compressing the film after drying. The proportion of the binder resin in the electroactive substance layer should be minimum and generally lies from 1 to 15% by weight. The proportion of the conductor material usually lies, when used, from 2 to 15% by weight of the electroactive substance layer.

The polymer electrolyte layer is formed on the respective electroactive substance layers thus prepared integrally therewith. The polymer electrolyte layer is comprised of a matrix of an ion-conductive polymer impregnated with or retaining a nonaqueous electrolyte solution containing a lithium salt. The polymer electrolyte layer occurs macroscopically in a solid state but microscopically retains a continuous phase of the lithium solution formed therein in situ. The polymer electrolyte layer of this type has an ion-conductivity higher than that of the corresponding polymer electrolyte free from the lithium solution.

The polymer electrolyte layer may be formed by polymerizing (heat polymerization, photopolymerization etc.,) a precursor monomer of the ion-conductive polymer in the form of a mixture with the nonaqueous electrolyte solution containing a lithium salt.

The monomer component which can be used for this purpose should include a polyether segment and also be polyfunctional in respect to the polymerization site so that the resulting polymer forms a three dimensional crosslinked gel structure. Typically, such monomers may be prepared by esterifying the terminal hydroxyl groups with acrylic or methacrylic acid (collestively called "(meth)acrylic acid"). As is well known in the art, polyether polyols are produced by addition-polymerizing ethylene oxide (EO) alone or in combination with propylene oxide (PO) using an initiator polyhydric alcohol such as ethylene glycol, glycerine or trimethylolpropane. A monofunctional polyether polyol (meth)acrylate may be used in combination with polyfunctional monomers.

The poly- and monofunctional monomers are typically represented by the following general formulas:

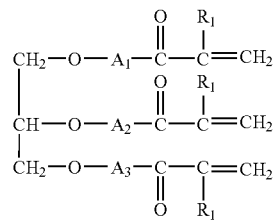

wherein $R_1$ is hydrogen or methyl;

$A_1$, $A_2$ and $A_3$ are each a polyoxyalkylene chain containing at least 3 ethylene oxide (EO) units and optionally some propylene oxide (PO) units such that PO/EO=0.25 and EO+PO$\geq$35.

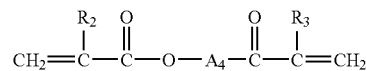

wherein $R_2$ and $R_3$ are hydrogen or methyl;

$A_4$ is a polyoxyalkylene chain containing at least 3 EO units and optionally some PO units such that PO/EO=0-5 and EO+PO$\geq$=10.

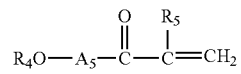

wherein $R_4$ is a lower alkyl, $R_5$ is hydrogen or methyl, and $A_5$ is a polyoxyalkylene chain containing at least 3 EO units and optionally some PO units such that PO/EO=0-5 and EO+PO$\geq$3.

Non-limitative examples of the organic solvents include ethylene carbonate (EC), propylene carbonate (PC), dimethyl carbonate (DMC), diethyl carbonate (DEC), γ-butyrolactone (GBL); and mixtures of these solvents. A mixed solvent of EC with another solvent is preferable. It is also preferable to use different solvent mixtures between the cathode side and the anode side, for example, a mixture of EC/GBL for the anode side and a mixture of EC/EMC for the cathode side.

The nonaqueous electrolyte solution is prepared by dissolving a lithium salt in the above solvent. Non-limitative examples of the lithium salt solutes include $LiClO_4$, $LiBF_4$, $LiAsF_6$, $LiPF_6$, $LiN(CF_3SO_2)_2$ and the like.

Since the ion-conductive polymer layer is of a laminate structure of sub-layers on the cathode side and the anode side, respectively, it is possible to use different lithium salts for both sub-layers, for example, $LiBF_4$ for the anode side and $LiPF_6$ for the anode side.

According to the present invention, the concentration of lithium salt in the nonaqueous electrolyte solution contained in the ion-conductive polymer is preferably at least 10% higher on the cathode side than on the anode side. For example, the concentration may be from 1.0 to 3.5 mol/L, preferably from 1.0 to 2.75 mol/L on the cathode side and from 0.9 to 2.0 mol/L on the anode side. This improves various performance, particularly the discharge characteristics under heavy loads and the charge-discharge cycle characteristics of the resulting battery.

Moreover, when the precursor monomer of ion-conductive polymer was polymerized in the mixture with the nonaqueous electrolyte solution having a lithium salt concentration in the above range, it was found that the amount of residual monomer on the cathode side was minimized. This is considered to be one of reasons why the interfacial resistance between the cathode and the ion-conductive polymer layer is decreased.

The proportion of the nonaqueous solution in the mixture with the precursor monomer should be large enough to maintain the solution as continuous phase in the crosslinked polymer electrolyte layer but should not be so excessive to undergo phase separation and bleeding of the solution from the gel. This can be accomplished by the ratio of the monomer to the electrolyte solution generally within a range from 30/70 to 2/98, preferably within a range from 20/80 to 2/98 by weight.

The monomer-electrolyte solution mixture may contain a suitable polymerization initiator depending on the polymerization method, for example, an initiator of peroxide or azo type in the heat polymerization and a photoinitiator such as 2,2-dimethoxy-2-phenylacetophenone in the photopolymerization. The polymer electrolyte layer may be formed integrally with the respective electrodes by casting the monomer-nonaqueous electrolyte solution mixture on the electroactive substance layer of the respective electrodes as a film and polymerizing the film by the heat polymerization or irradiating the film with UV radiation. When used, a separator is placed on either one of the electrodes and the above procedure may be followed thereafter. Preferably, the separator is a porous membrane made of a polymer such as polypropylene, polyethylene or polyester having an air-permeability from 1 to 500 sec/cm$^3$ although it is not limited thereto.

The battery of the present invention is assembled by joining the sub-layers of polymer electrolyte integrally formed with the respective electrodes together.

EXAMPLE

The following Examples are for illustrative purpose only and not intended to limit the scope of the present invention thereto.

Example 1

100 weight parts of graphite powder having amorphous carbon attached on the surfaces thereof was blended with 9 weight % of polyvinylidene fluoride (PVDF) as a binder. The blend was kneaded with an amount of N-methyl-2-pyrrolidone (NMP). The resulting paste was applied on a copper foil in a uniform thickness, dried and compressed to prepare an anode.

LiPF$_6$ was dissolved at a concentration of 1.0 mol/L in a mixed solvent of ethylene carbonate (EC) and ethylmethyl carbonate at a volumetric ratio of 1:2 to prepare a nonaqueous electrolyte solution.

To the above nonaqueous electrolyte solution was mixed at a weight ratio of 90:10 a trifunctional polyether polyacrylate having a molecular weight of 7,500 to 9,000 of the formula:

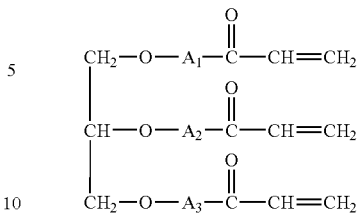

wherein $A_1$, $A_2$ and $A_3$ are each polyoxyalkylene chain containing at least 3 EP units and at least one PO unit at PO/EO ratio of 0.25. A polymerization solution was prepared by adding 1,000 ppm of 2,2-dimethoxy-2-phenylacetophenone (DMPA).

This monomer/electrolyte solution mixture was cast on the electroactive substance layer of the anode and then irradiated with UV radiation of 365 nm wavelength at an intensity of 30 mW/cm$^2$ for 3 minutes to polymerize the monomer in situ. An ion-conductive polymer gel layer having a thickness of 20 μm was formed on the anode integrally therewith.

100 weight parts of LiCoO$_2$ powder, 5 weight % of PVDF binder and 3 weight % of acetylene black conductor material were blended and kneaded with an amount of NMP. The resulting paste was applied on an aluminum foil into a uniform thickness, dried and compressed to prepare a cathode.

Separately, LiPF$_6$ was dissolved at a concentration of 1.5 mol/L in a mixed solvent of EC and γ-butyrolactone (GBL) at a volumetric ratio of 3:7 to prepare a nonaqueous electrolyte solution.

To the resulting electrolyte solution were added the above trifunctional polyether polyol polyacrylate at a weight ratio of 97.5:2.5 and 500 ppm of DMPA to prepare a polymerization solution.

The resulting monomer/electrolyte solution mixture was cast on the electroactive substance layer of the cathode and then irradiated with UV radiation of 365 nm wavelength at an intensity of 30 mW/cm$^2$ for 3 minutes to polymerize the monomer in situ. An ion-conductive polymer gel layer having a thickness of 20 μm was formed on the cathode integrally therewith.

Finally, the ion-conductive polymer layers integrally formed on the respective electrodes were joined together to produce a battery.

Figure 6:
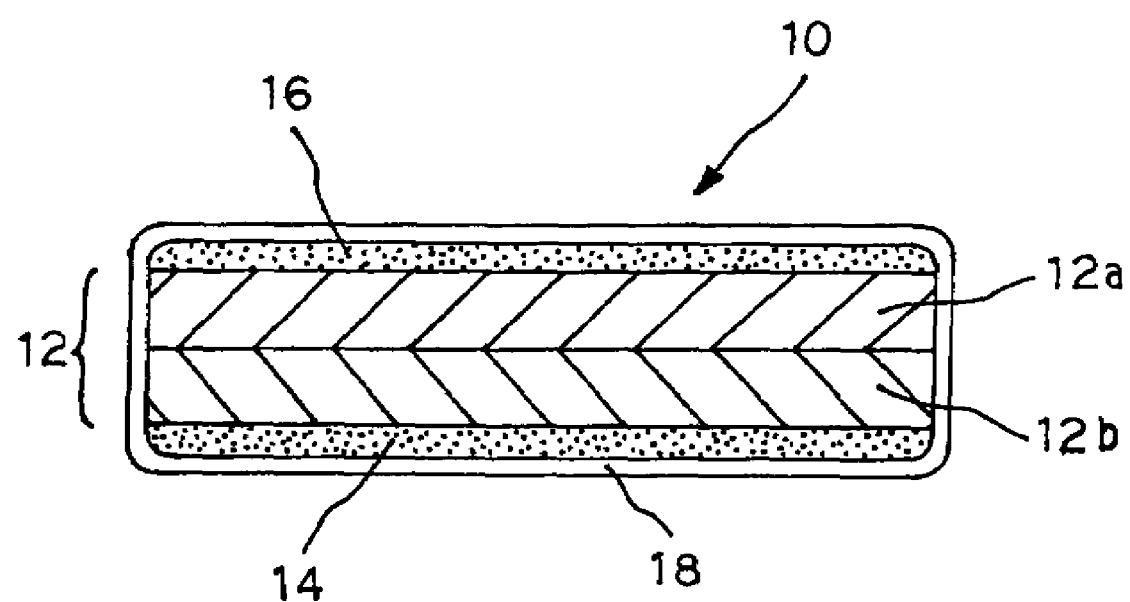
FIG. 6 shows the battery of the present invention schematically in cross section.

The resulting battery 10 is shown in FIG. 6 schematically in cross-section in which an ion-conductive polymer layer 12 comprising a first sub-layer 12a on the cathode side and a second sub-layer 12b on the anode side is sandwiched between the anode 14 and the cathode 16 within a sealed container 18.

Comparative Example 1

Example 1 was repeated except that the lithium salt concentraion of the electrolyte solution retained by the ion-conductive polymer gel layer on the cathode was changed to 1.0 mol/L.

The batteries of Example 1 and Comparative Example 1, respectively were charged at a constant current of 2.3 mA until the battery voltage reached 4.1 V. After reaching this voltage level, charge was continued at a constant voltage for 12 hours. Each battery was discharged at different current levels of 2.3 mA, 5 mA, 10 mA and 20 mA until the battery voltage decreased to 2.75 V. The results of this charge-discharge test under the above conditions are shown in the graph of FIG. 1. The batteries of Example 1 and Comparative Example 1 were discharged at a constant current of 10 mA. The discharge curves of batteries in this test are shown in the graph of FIG. 2.

As shown in FIG. 1, a remarkable difference was seen in the discharge capacity between batteries when discharged at various current levels by setting the lithium salt concentration of the electrolyte solution retained by the ion-conductive polymer layer on the cathode higher than the corresponding concentration of the electrolyte solution retained by the ion-conductive polymer layer on the anode.

Figure 2:
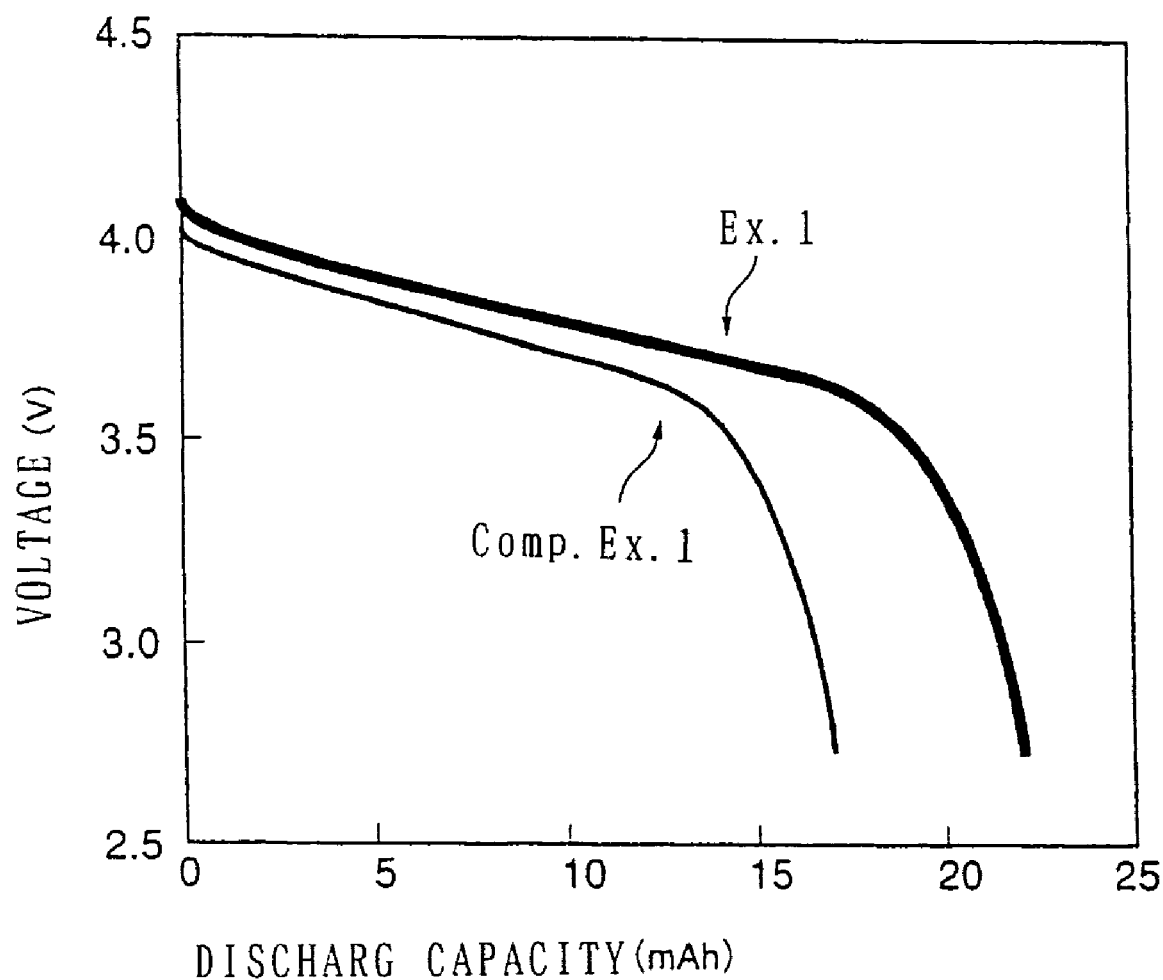
FIG. 2 is a graph showing the discharge curve of the battery of Example 1 of the present invention at a constant current of 10 mA in comparison with the battery of Comparative Example 1.

Also as shown in the discharge curves of FIG. 2, decease in voltage immediately after discharge is smaller in the battery of Example 1 than in the battery of Comparative Example 1 and the average discharge voltage is higher in the battery of Example 1 than the battery of Comparative Example 1. These results suggest that the interfacial resistance between the cathode and the ion-conductive polymer layer is lowered.

The effect of the difference in the lithium salt concentration of the electrolyte solution retained by the ion-conductive polymer layer formed on the cathode on the level of residual monomer in the polymerized layer was studied. The monomer/electrolyte solution mixture used in Example 1 (lithium salt=1.6 mol/L) and the mixture used in Comparative Example 1 (lithium salt=1.0 mol/L), respectively cast on a stainless steel foil and polymerized under the same conditions of Example 1 and Comparative Example 1. Samples were taken from respective polymerized layers and assayed for the level of residual monomer by the GPC. The level of residual monomer was 4.2% for Example 1 and 7.1% for Comparative Example 1. This suggests that the level of residual monomer relates to the interfacial resistance between the cathode and the ion-conductive layer formed thereon.

Example 2

A blend of 100 weight parts of natural graphite powder (Madagacar), 7 weight % of PVDF binder and 1 weight % of graphatized carbon black was kneaded with an amount of NMP. The resulting paste was cast on a copper foil uniformly, dried and compressed to prepare a cathode.

$LiN(CF_3SO_2)_2$ was dissolved at a concentration of 1 mol/L in a mixture of DC:DMC at a volumetric ratio of 1:2 to prepare an electrolyte solution. To this solution were mixed the same trifunctional polyether polyol polyacrylate as used in Example 1 at a weight-ratio of 90:10. A polymerization solution was prepared by adding 1,000 ppm of DMPA to this mixture.

This monomer/electrolyte solution mixture was cast on the electroactive substance layer of the anode and then irradiated with UV radiation of 365 nm wavelength at an intensity of 30 mW/cm$^2$ for 3 minutes to polymerize the monomer in situ. An ion-conductive polymer gel layer having a thickness of 20 μm was formed on the anode integrally therewith.

100 weight parts of $LiCo_{0.9}Ni_{0.1}O_2$ powder, 5 weight % of PVDF binder and 3 weight % of acetylene black conductor material were blended and kneaded with an amount of NMP. The resulting paste was applied on an aluminum foil into a uniform thickness, dried and compressed to prepared a cathode.

Separately, $LiPF_6$ was dissolved at a concentration of 1.5 mol/L in a mixed solvent of EC and γ-butyrolactone (GBL) at a volumetric ratio of 3:7 to prepare a nonaqueous electrolyte solution.

To the resulting electrolyte solution were added the above trifunctional polyether polyol polyacrylate at a weight ratio of 95:5 and 500 ppm of DMPA to prepare a polymerization solution.

The resulting monomer/electrolyte solution mixture was cast on the electroactive substance layer of the cathode and then irradiated with UV radiation of 365 nm wavelength at an intensity of 30 mW/cm$^2$ for 3 minutes to polymerize the monomer in situ. An ion-conductive polymer gel layer having a thickness of 20 μm was formed on the cathode integrally therewith.

Finally, the ion-conductive polymer layers integrally formed on the respective electrodes were joined together to produce a battery.

Example 3

Example 2 was repeated except that the graphite powder having amorphous carbon attached on the surfaces thereof was used as an anodic electroactive substance.

Comparative Exmaple 2

Example 2 was repeated except that the lithium salt concentration of the electrolyte solution retained in the ion-conductive polymer gel layer was altered to 1 mol/L for the cathode and 2 mol/L for the anode, respectively.

The batteries of Examples 2, 3 and Comparative Example 2, respectively were charged at a constant current of 2.3 mA until the battery voltage reached 4.1 V. After reaching this voltage, the charge was continued at a constant voltage for 12 hours. Each battery was discharged at a constant current of 2.3 mA and the charge-discharge cycle under the above condition was repeated. The results are shown in the graph of FIG. 3.

Figure 3:
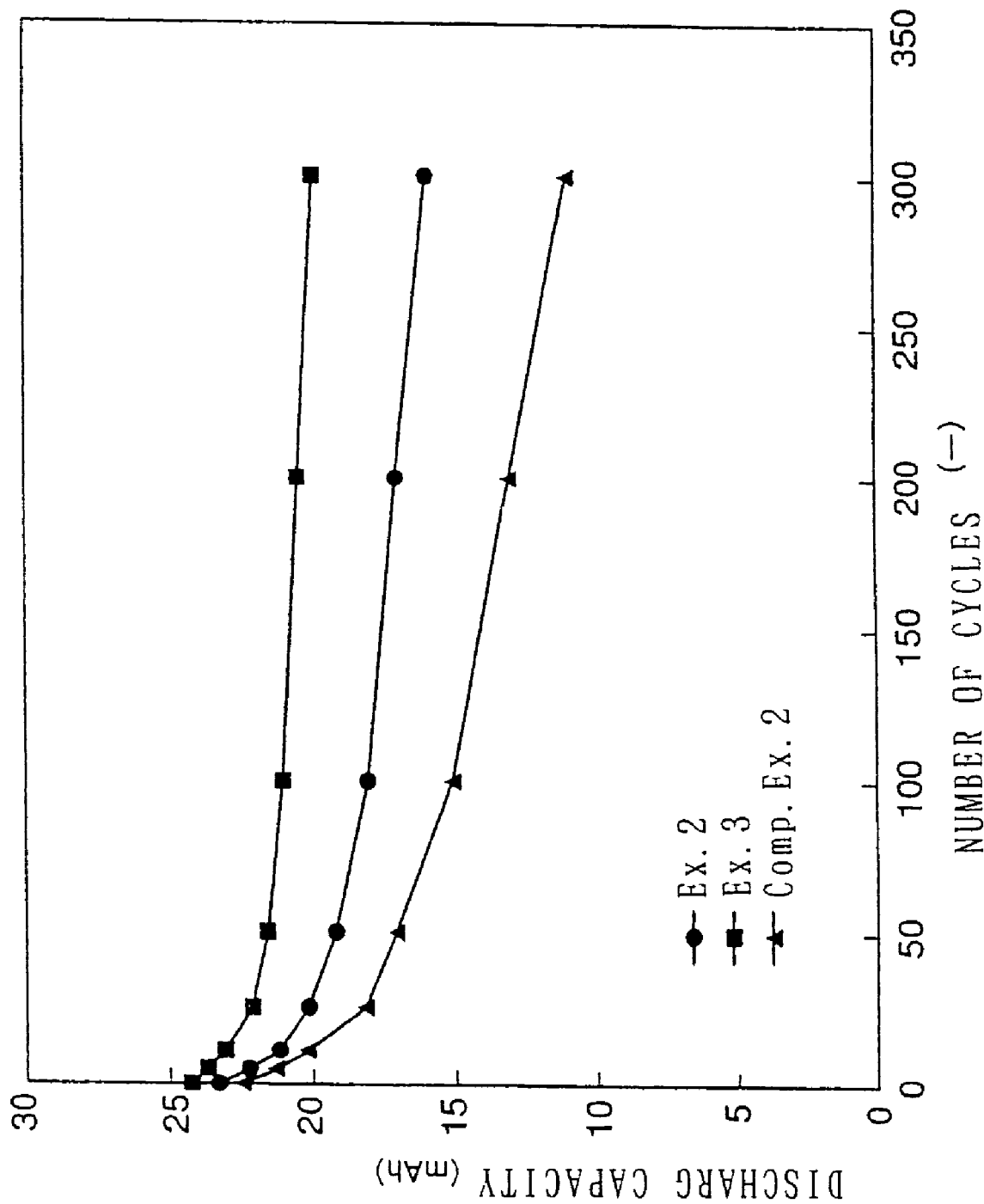
FIG. 3 is a graph showing the results of repeated charge-discharge cycle test performed on the batteries of Examples 2 and 3 of the present invention in comparison with the battery of Comparative Example 2.

As shown in FIG. 3, the battery of Example 2 exhibited a discharge capacity higher than the battery of Comparative Example 2 when compared at the same number of repeated charge-discharge cycles. The prolonged charge-discharge cycle life is considered to be attributable to the elevated lithium salt concentration in the ion-conductive polymer gel layer on the cathode compared to the corresponding lithium salt concentration on the anode side.

Similarly, when comparison is made between the batteries of Example 2 and Example 3, the battery of Example 3 retained a discharge capacity higher than the battery of Example 2 at the same number of repeated charge-discharge cycles. The prolonged charge-discharge cycle life is considered to be attributed the use of graphite carbonaceous material having attached amorphous carbon instead of natural graphite as such.

Example 4

In this Example, a battery was manufactured by the following steps of a)-e).

a) 100 weight parts of $V_2O_5$ as a cathodic electroactive substance, 180 weight parts of 3 wt. % solution of ethylene/1,3-cyclohexadiene copoymer in xylene as a binder solution, and 5 weight parts of acetylene black as a conductor material were kneaded. The resulting paste was applied on a rolled aluminum foil, dried and compressed to prepare a cathode.

b) LiBF$_4$ was dissolved in a mixture of EC:GBL:EMC at a volumetric ratio of 35:35:30 at a concentration of 2.0 mol/L. To this solution was added the above functional polyether polyol polyacrylate at a weight ratio of 95:5 followed by addition of 500 ppm of DMPA. The resulting monomer/electrolyte solution was cast on the electroactive substance layer of the cathode and irradiated with UV radiation of 365 nm wavelength at an intensity of 30 mW/cm$^2$ for 3 minutes to polymerize the monomer in situ. An ion-conductive polymer gel layer having a thickness of 20 μm was formed on the cathode integrally therewith.

c) Lithium metal was used as an anodic electroactive substance by applying lithium metal on a copper foil collector under pressure.

Then, a 1.0 mol/L solution of LiBF$_4$ in a mixed solvent of EC:GBL:EMC at a volmetric ratio of 35:35:30 was prepared and the above trifunctional polyether polyol polyacrylate was added to the resulting electrolyte solution at a weight ratio of 5:95. A polymerization solution was prepared by addition 500 ppm of DMPA to this monomer/electrolyte solution mixture.

The resulting polymerization solution was cast on the lithium metal layer of the anode and irradiated with UV radiation of 365 nm wavelength at an intensity of 30 mW/cm$^2$ for 3 minutes to polymerize the monomer in situ. An ion-conductuve polymer gel layer having a thickness of 20 μm was formed on the anode integrally therewith.

d) The battery of Example 4 was produced by joining the ion-conductive polymer layer/lithium/collector assembly prepared in step c) and the collector/cathodic electroactive substance layer/ion-conductive layer assembly prepared in step b) with the polymer layers facing inwardly.

Comparative Example 3

Example 4 was repeated except that the lithium salt concentration of the electrolyte solution retained in the ion-conductive polymer gel layer on the cathode was altered to 1.0 mol/L.

The batteries of Example 4 and Comparative Example 3, respectively were charged at a constant current of 2.3 mA until the battery voltage reached 3.2 V and discharged at a constant current of 2.3 mA until the battery voltage decreased to 2.0 V. The results of this charge and discharge test are shown in FIG. 4.

Figure 4:
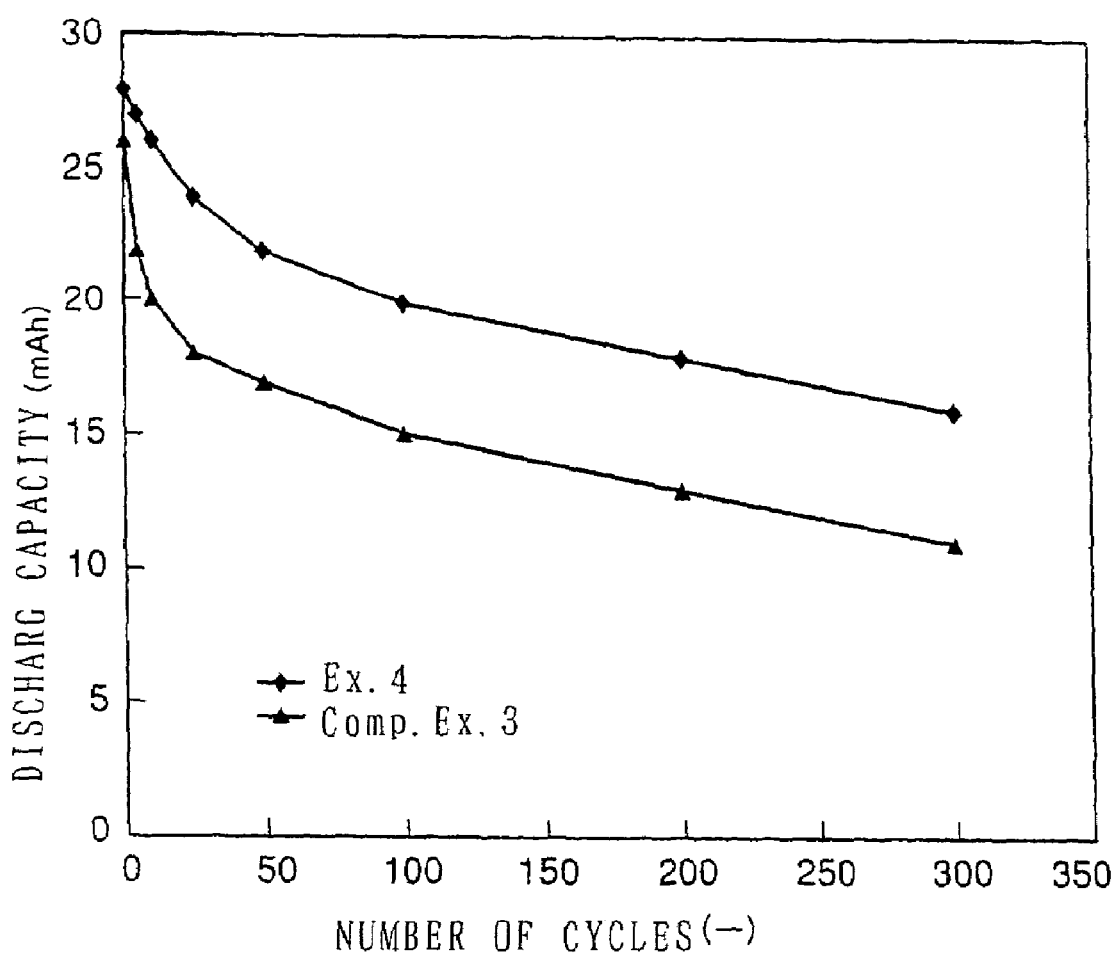
FIG. 4 is a graph showing the results of repeated charge-discharge cycle test performed on the battery of Example 4 of the present invention in comparison with the battery of Comparative Example 3.

As shown in FIG. 4 the battery of Example 4 is excellent in the charge-discharge cycle characteristics compared to the battery of Comparative Example 3. This demonstrates that the charge-discharge cycle life may be prolonged by elevating the lithium salt concentration in the ion-conductive polymer gel layer to a higher level on the cathode side than on the anode side.

When comparison is made between FIG. 3 and FIG. 4, the use of graphite powder having amorphous carbon attached to the graphite surfaces as a cathodic electroactive substance is advantageous over lithium metal in the charge-discharge cycle characteristics and, therefore, use of such a carbonaceous material is most preferable for the battery of the present invention.

Example 5

Example 4 was repeated except that a polyester nonwoven fabric having a air-permeability of 150 sec/cm$^3$ in step b) of Exmaple 4 and the monomer/electrolyte solution mixture was cast thereon. The total thickness of the resulting ion-conductive polymer layer was 20 μm.

Comparative Example 4

The battery of Comparative Example 4 was manufactured by the following steps a)-e).

a) Same as in Example 4 to prepare a cathode.

b) Example 4 was followed except that the lithium salt concentration in the electrolyte solution was 1.0 mol/L. An ion-conductive polymer gel layer having a thickness of 1.0 μm was formed on the cathode integrally therewith.

c) Example 4 was followed except that the lithium salt concentration in the electrolyte solution was 2.0 mol/L. An ion-conductive polymer gel layer of 10 μm thickness was formed on the anode integrally therewith.

d) The same polyester nonwoven fabric as used in Example 5 was impregnated with the monomer/electrolyte solution mixture prepared in step c) above. The impregnated fabric was sandwiched between a pair of quartz plates and irradiated with UV radiation of 365 wavelength at an intensity of 30 mA/cm$^2$ for 3 minutes to form an ioin-conductive polymer gel layer of 20 μm thickness integrally with the polyester nonwoven fabric separator.

e) The separator including the ion-conductive polymer prepared in step d) was sandwiched between the cathode collector/anode/ion-conductive polymer layer assembly prepared in step b) and the ion-conductive polymer layer/lithium/anode collector assembly prepared in step c) and joined together with the ion-conductive polymer layers facing the separator to prepare the battery of Comparative Example 4.

The batteries of Example 5 and Comparative Example 4 were each charged at a constant current of 2.3 mA until the battery voltage reached 4.1 V. Thereafter, charge was continued at a constant voltage for 12 hours. Then each battery was discharged at different constant current levels of 2.3 mA, 5 mA, 10 mA and 20 mA until the battery voltage decreased to 2.75 V. The results of the charge-discharge test under the above conditions are shown in FIG. 5.

Figure 5:
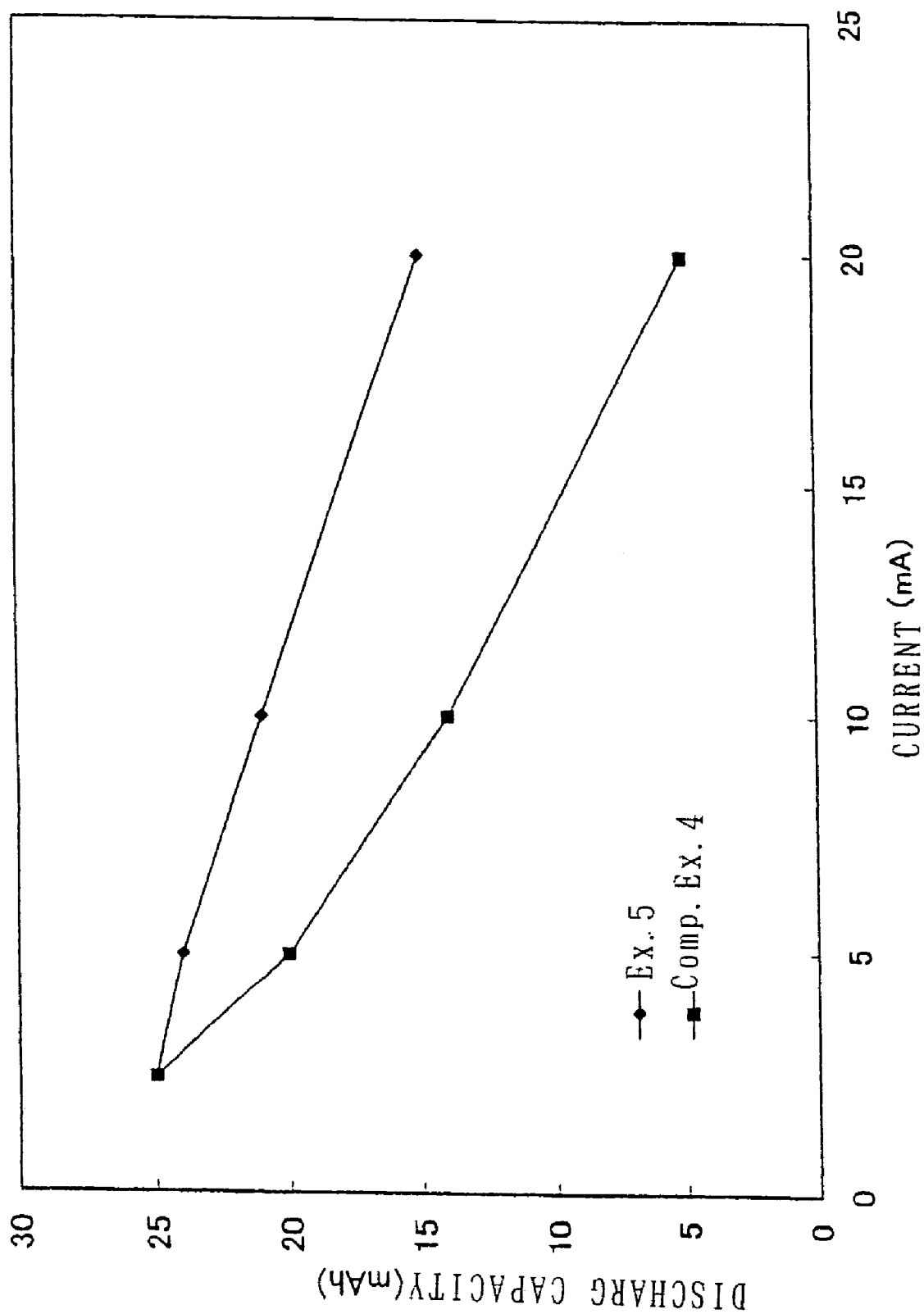
FIG. 5 is a graph showing the discharge capacity of the battery of Example 5 of the present invention at different current levels in comparison with the battery of Comparative Example 4.

As shown in FIG. 5, a remarkable difference in the discharge capacity at different current levels is seen between the battery having two ion-conductive polymer layers (Example 5) and the battery having three ion-conductive polymer layers (Comparative Example 4). It is also observed that the battery capacity upon discharge at a hight current level may not be improved unless the litnium salt concentration in the ion-conductive polymer layer is higher on the cathode side than on the anode side regardless of the lithium salt concentration in the ion-conductive polymer retained in the separator.

The invention claimed is:

1. A lithium secondary battery comprising an anode for lithium batteries, a cathode containing lithium or capable of inclusion and release of lithium, and an ion-conductive polymer layer sandwiched between the cathode and the anode, wherein said ion-conductive layer is a laminate of two sub-layers each comprising a matrix of said ion-conductive polymer retaining a non-aqueous electrolyte solution therein, wherein said ion-conductive polymer is a homo- or copolymer of polyether polyol poly(meth)acrylate including an ethylene oxide unit and optionally a propylene oxide unit in the polyether chain, and wherein said sub-layers are integral with the respective electrodes and said nonaqueous electrolyte solution contains a lithium salt dissolved in an organic solvent, and wherein the concentration of said lithium salt is higher in said non-aqueous electrolyte solution retained in the sub-layer on the cathode side than in said non-aqueous electrolyte solution retained in the sub-layer on the anode side.

2. The lithium secondary battery according to claim 1, wherein the electroactive substance of said anode is a carbonaceous material capable of electrochemical inclusion and release of lithium, and the electroactive substance of said cathode is a chalcogenide compound containing lithium.

3. The lithium secondary battery according to claim 1, wherein the concentration of said lithium salt in said nonaqueous electrolyte solution is at least 10% higher on the cathode side than on the anode side.

4. The lithium secondary battery according to claim 1, wherein the concentration of said lithium salt in the nonaqueous electrolyte solution retained in the ion-conductive polymer sub-layer is about 1.0 to 3.5 mol/L on the cathode side and about 0.8 to 2.2 mol/L on the anode side.

5. The lithium secondary battery according to claim 2, wherein said carbonaceous material is graphite powder having amorphous carbon attached to the surfaces thereof.

6. The lithium secondary battery according to claim 1, wherein the organic solvent of said nonaqueous electrolyte solution is selected from the group consisting of ethylene carbonate, propylene carbonate, ethyl methyl carbonate, dimethyl carbonate, diethyl carbonate, γ-butyrolactone and a mixture thereof.

7. The lithium secondary battery according to claim 1, wherein said nonaqueous electrolyte solution in said ion conductive electrolyte sub-layer on the cathode side contains an organic solvent and/or a lithium salt which is different from the organic solvent and/or the lithium salt in said nonaqueous electrolyte solution retained in said ion conductive sub-layer on the anode side.

8. The lithium secondary battery according to claim 1, wherein the ion-conductive polymer sub-layer either on the anode side or the cathode side includes a separator which is integral with the associated ion-conductive polymer sub-layer.

9. The lithium secondary battery according to claim 1, wherein the electroactive substance of said anode is lithium or a lithium alloy, while the electroactive substance of said cathode is an oxide of a periodic group 4A, 4B, 5A, 5B, 6A, 6B, 7A or 8 metal.

10. The lithium secondary battery according to claim 9, wherein the electroactive substance of said anode is lithium or a lithium alloy, while the electroactive substance of said cathode is $TiS_2$, $SiO_2$ or $SnO$.

11. The lithium secondary battery according to claim 9, wherein the electroactive substance of said anode is lithium or a lithium alloy, while the electroactive substance of said cathode is $V_2O_5$, $V_6O_{12}$, $VOx$, $Nb_2O_5$, $Bi_2O_3$ or $Sb_2O_3$.

12. The lithium secondary battery according to claim 9, wherein the electroactive substance of said anode is lithium or a lithium alloy, while the electroactive substance of said cathode is $CrO_3$, $Cr_2O_3$, $MoS_2$, $WO_3$ or $SeO_3$.

13. The lithium secondary battery according to claim 9, wherein the electroactive substance of said anode is lithium or a lithium alloy, while the electroactive substance of said cathode is $MnO_2$ or $Mn_2O_3$.

14. The lithium secondary battery according to claim 9, wherein the electroactive substance of said anode is lithium or a lithium alloy, while the electroactive substance of said cathode is $Fe_2O_3$, $FeO$, $Fe_3O_4$, $Ni_2O_3$, $NiO$, $CoS_2$ or $CoO$.

* * * * *